United States Patent [19]

Iwamura et al.

[11] Patent Number: 5,377,053
[45] Date of Patent: Dec. 27, 1994

[54] MAGNETIC REPRODUCTION APPARATUS FOR REPRODUCING A VIDEO SIGNAL

[75] Inventors: Soichi Iwamura, Fuchu; Junichi Aoki, Kashiwa; Hiroaki Nogami, Matsudo, all of Japan

[73] Assignee: Sharp Kabushiki Kaisha, Osaka, Japan

[21] Appl. No.: 910,757

[22] Filed: Jul. 8, 1992

[30] Foreign Application Priority Data

Jul. 10, 1991 [JP] Japan .................. 3-169914

[51] Int. Cl.[5] .............................................. H04N 5/78
[52] U.S. Cl. ..................... 360/36.1; 360/30; 358/335
[58] Field of Search ............ 360/36.1, 36.2, 30, 360/33.1; 358/335, 330

[56] References Cited

U.S. PATENT DOCUMENTS

| | | | |
|---|---|---|---|
| 4,367,494 | 1/1983 | Kimura | 360/36.1 X |
| 4,403,244 | 9/1983 | Fujishima | 358/19 |
| 4,573,086 | 2/1986 | Sakai et al. | 358/330 X |
| 4,580,174 | 4/1986 | Tokunaka | 358/330 X |
| 4,591,930 | 5/1986 | Baumeister | 360/35.1 |
| 4,843,334 | 6/1989 | Ishikawa et al. | 329/122 |
| 5,062,005 | 10/1991 | Kitaura et al. | 360/36.1 X |
| 5,166,806 | 11/1992 | Ebisawa et al. | 360/36.1 |

FOREIGN PATENT DOCUMENTS

| | | |
|---|---|---|
| 0289046 | 11/1988 | European Pat. Off. . |
| 0379212 | 7/1990 | European Pat. Off. . |
| 63-185177 | 7/1988 | Japan . |
| 274290 | 11/1988 | Japan . |
| 82572 | 6/1989 | Japan . |
| 264492 | 10/1989 | Japan . |
| 305785 | 12/1989 | Japan . |
| 2-218278 | 8/1990 | Japan . |
| 262392 | 11/1991 | Japan . |

OTHER PUBLICATIONS

S. Iwamura et al., "HDTV Recording by a Conventional Home VCR", National Conference on Consumer Electronics, Jun. 2-4, 1992; pp. 46-47.

S. Iwamura et al.; "Video Signal Processing in HD VCR for Baseband/Muse Analog Recording", IEEE Transactions on Consumer Electronics, vol. 36, No. 4, pp. 777-785, Nov. 1990.

S. Iwamura et al.; "Lower Shifting FM Carrier Recording in HD VCR For Baseband/Muse Signals" ICCE Digest pp. 188-189, Jun. 1991.

*Primary Examiner*—Andrew L. Sniezek
*Attorney, Agent, or Firm*—David G. Conlin; Robert F. O'Connell; Kevin J. Fournier

[57] ABSTRACT

A magnetic reproduction apparatus which uses a magnetic recording medium on which frequency-modulated signals produced by frequency-modulating a carrier with video signals are recorded, and demodulates reproduced signals from the magnetic recording medium into the video signals. The apparatus includes a frequency convertor for causing the reproduced signals to shift to a higher frequency region and a pulse-count-type FM demodulator for demodulating the reproduced signals which have shifted to the higher frequency region into the video signals. This arrangement restrains the mixing of the reproduced signals in the video signals. Therefore the video signals are reproduced with lessened waveform distortion, achieving a high-quality image.

8 Claims, 10 Drawing Sheets

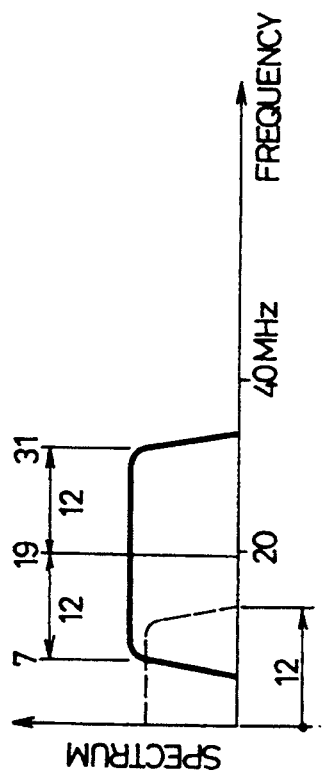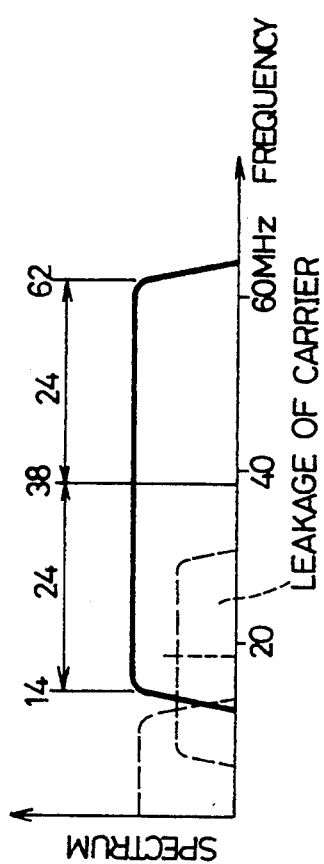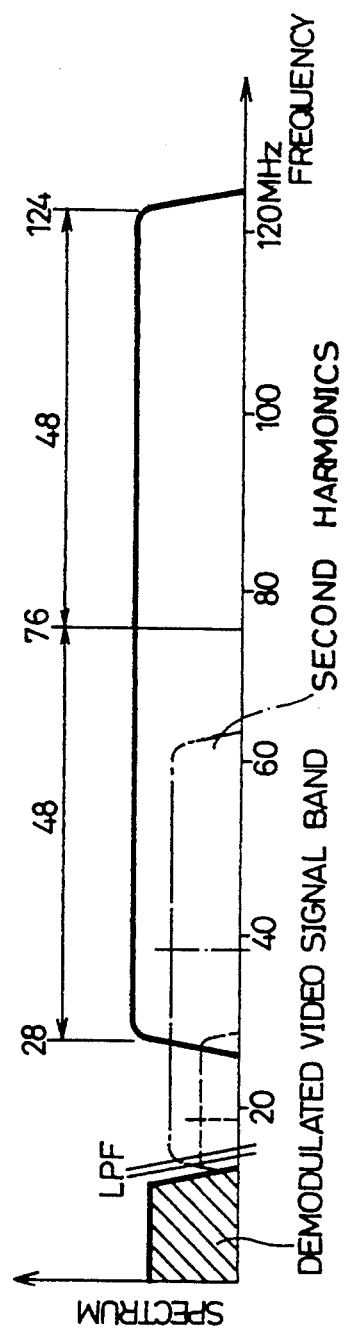
FIG.7 (a) PRIOR ART
FIG.7 (b) PRIOR ART
FIG.7 (c) PRIOR ART

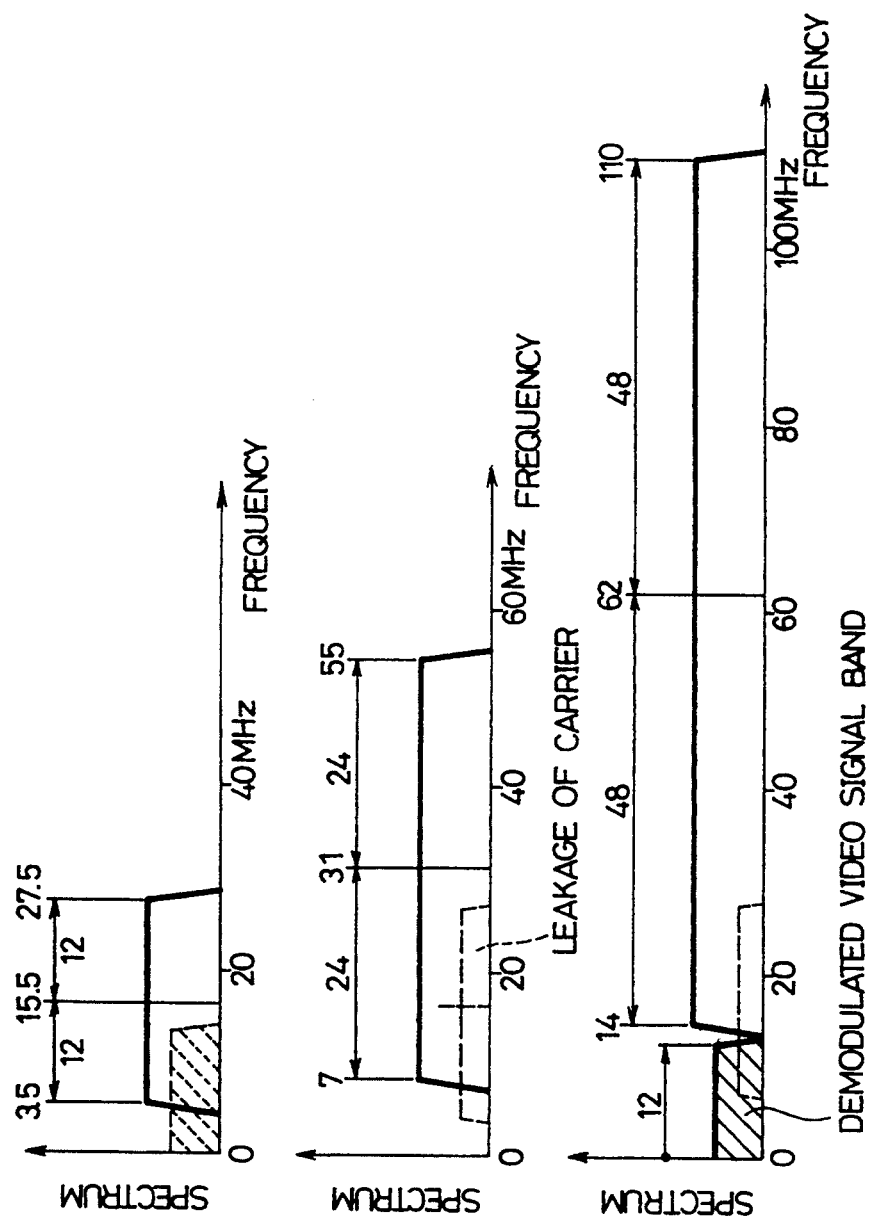
FIG. 8 (a) PRIOR ART
FIG. 8 (b) PRIOR ART
FIG. 8 (c) PRIOR ART

MAGNETIC REPRODUCTION APPARATUS FOR REPRODUCING A VIDEO SIGNAL

FIELD OF THE INVENTION

The present invention relates to a magnetic reproduction apparatus which reproduces wide-band video signals such as HDTV (High Definition Television) signals recorded on a magnetic recording medium.

BACKGROUND OF THE INVENTION

The following will explain a common method for producing a TCI (time-compressed integration) signal from a wide-band video signal. With this method, assuming that a luminance signal Y whose bandwidth is 20 MHz and color-difference signals $P_R$, $P_B$ having a bandwidth of 6 MHz are used as baseband HDTV signals, the signals of three channels with different transmission bandwidths are transmitted over one or two common channel(s) by time-division multiplexing and a TCI signal is composited.

FIG. 5 illustrates a system for encoding/decoding such baseband signals into a two-channel TCI signal, and the waveforms of input and output signals of a TCI encoder 51 are shown as an example in FIG. 6. A TCI signal $T_1$ of channel 1 is produced through the processes shown in FIG. 6. As for a luminance signal $Y_1$ for an odd numbered line, the duration of one entire scanning line is 29.63 μs and the bandwidth is 20 MHz. The TCI encoder 51 firstly converts a portion of the luminance signal $Y_1$ corresponding to an effective scanning period into $Y_{1T}$ with a bandwidth of about 12 MHz by time-expanding it by 1.68 times. Regarding a color-difference signal $P_{R1}$ of the 6-MHz bandwidth for the odd numbered line, the TCI encoder 51 converts a portion of the color-difference signal $P_{R1}$ corresponding to the effective scanning period into $(P_{R1})_T$ with a bandwidth of about 12 MHz by time-compressing it to half of its original length. Then, the TCI signal $(T_1)$ is produced by compositing $Y_{1T}$ and $(P_{R1})_T$ through the time-division integration operation. Next, a TCI signal $(T_2)$ of channel 2 is produced from a luminance signal $Y_2$ and a color-difference signal $P_{B2}$ for an even numbered line in a similar manner by the time-division integration operation.

A line-sequenced color-difference two-channel TCI signal having the 12-MHz bandwidth is thus obtained by time-expanding the luminance signal Y and the color-difference signal $P_R$ or $P_B$, extracted from every other line, and by performing time-division integration. In the time-division integration of the luminance signal Y of a bandwidth of 20 MHz and the color-difference signals $P_R$, $P_B$ of the 6-MHz bandwidth, the bandwidth is calculated by $(20+6)$ MHz/2 = 13 MHz. However, with the time-division integration, only the information corresponding to the effective scanning period is used, and therefore a bandwidth of 12 MHz is achieved.

The TCI signals of two channels are recorded in parallel on a magnetic tape. The TCI signals reproduced from the magnetic tape are converted into the original baseband signals by a TCI decoder 52. In the TCI decoder 52, the reverse processes of the TCI encoder 51 are performed. In the reproduced signals, since the $P_R$ or $P_B$ signal is missing every other line, the baseband signals are reconstructed based on line interpolation.

To record the TCI signal of the 12-MHz bandwidth with VTR, an FM signal obtained by frequency-modulating a 19-MHz carrier frequency with the TCI signal is recorded on the magnetic tape. The spectrum of the FM signal is shown in FIG. 7(a). It can be seen from the figure that the lower edge of the lower sideband is 7 MHz. In reality, however, there exist a relatively large number of components whose frequencies are below this sideband.

The following explains the case where a pulse-count-type FM demodulator (wherein a one-shot multivibrator is actuated at every zero crossing point of the FM signal) is employed and the reproduced signal does not contain the even higher harmonics of the carrier. In this case, the demodulated signal consists of components, namely, the TCI signal, harmonics having a frequency that is twice the FM signal frequency, odd harmonics of the frequency-doubled harmonics. In theory, the fundamental waves of the FM signal are not produced. The second harmonics have a center frequency of 38 MHz, and the lower edge of the lower sideband is 14 MHz. It is thus possible to separate TCI signal of the 12-MHz bandwidth from the demodulated signal. However, in fact, the fundamental waves of the FM signal leak due to various reasons, and thereby the DU (Desired signal to Undesired Signal) ratio of the TCI signal results in around 30 dB to 40 dB.

Then, the following method using a frequency doubler is proposed. In this method, as illustrated in FIG. 7(b), the reproduced signal is first input into the frequency doubler where its center frequency is raised to 38 MHz, and then input into a pulse-count-type FM demodulator where the frequency is doubled. As a result, the lower edge of the lower sideband becomes 28 MHz as indicated in FIG. 7(c), making it easy to separate the TCI signal. However, if the components of the FM signal leak, the leaked components are contained in the output signal of the FM demodulator. Moreover, if the output of the frequency doubler contains an FM signal whose frequency is four times that of the input signal as well as the FM signal with a frequency twice that of the input signal, the FM signal with the frequency twice that of the input signal is contained in the output signal of the demodulator as shown by the alternate long and one short dash line in FIG. 7(c). When these lower sideband components are mixed in the TCI signal, interference beats are produced.

Meanwhile, according to an FM carrier reset method wherein the phase of an FM carrier (hereinafter an FM signal is referred to as an FM carrier) corresponding to the front porch of a horizontal sync pulse is taken as a reference phase and the phase of an FM carrier corresponding to the tip portion of the horizontal sync pulse is reset to the reference phase every line (see Japanese Publication for Unexamined Patent No. 274290/1988). This method brings about a horizontal correlation between the FM carriers. Consequently, the correlation between the lower sideband components and the reproduced image becomes significant. This stops the running of beat stripes which appear in the reproduced image on the screen when the lower sideband components of the FM carrier leak into the demodulated signal. Therefore, although distortion of the image occurs, deterioration of quality of the image can not be detected as the distortion is almost invisible.

In order to fully enjoy the horizontal correlation effect, the applicant of the present invention proposed a method of recording or reproducing an FM carrier which has shifted to a lower frequency (see Japanese Publication for Unexamined Patent No. 48391/1991). In this method, as illustrated in FIG. 8(a), while the parameters of frequency modulation (TCI signal bandwidth: 12 MHz, emphasis level: 12 dB at 11 MHz) are unchanged, the center frequency shifts from 19 MHz to 15.5 MHz. In this case, the reproduced signal is doubled by the frequency doubler as shown in FIG. 8(b) and then multiplied by four times by a pulse-count-type FM demodulator as indicated in FIG. 8(c). The lower edge of the lower sideband of the FM carrier is 14 MHz. Since the center frequency is close to the TCI signal band (the video signal band), some sideband components may leak and cause detectable image distortion. Therefore, as a strictest test, recording and reproduction of a 100% multiburst signal was performed. The results are that, even when image distortion caused by the multiburst signal is in a undetectable level, distortion of waveform reaches around 10%.

In order to minimize signal distortion to a invisible level on the screen, the signal must be recorded on a magnetic tape with the modulation method in which the phase of an FM carrier corresponding to the tip portion of a horizontal sync pulse is reset to a reference phase. An example of the operation with this method is briefly explained below.

As shown in FIG. 9, a horizontal/vertical pulse separation circuit 61 and a master clock generator 62 are interlocked such that the master clock generator 62 produces pulses which are phase-locked with horizontal and vertical sync pulses separated from the TCI signal by the horizontal/vertical pulse separation circuit 61. In this case, if the duration of a single scanning line of the TCI signal is equal to that of two scanning lines of the luminance signal Y (see FIG. 6), it is possible to simplify the synchronizing panel of the TCI encoder. Further, this arrangement enables the unification of clock systems used for processing signals in a video tape recorder.

After the high frequency region of the TCI signal is emphasized in a pre-emphasis circuit 63, the TCI signal is input into a multivibrator 64 for frequency modulation. The multivibrator 64 is connected to a pulse generator 65, a pulse generator 66, and a reference frequency generator 67 for automatic frequency control. The pulse generator 65 generates pulses for resetting the phase of a carrier corresponding to the front porch of the TCI signal to a reference phase. Meanwhile, the pulse generator 66 generates pulses for resetting the phase of a carrier corresponding to the tip portion of a horizontal sync pulse to a reference phase. As illustrated in FIG. 10, after resetting the phase of the FM carrier corresponding to the front porch of the TCI signal to the reference phase, the phase of the FM carrier corresponding to the tip portion of the horizontal sync pulse is reset to the reference phase. In general, resetting causes discontinuous variations in the phase of the FM carrier. Therefore, when these portions are frequency-demodulated, transient distortion occurs. To prevent such distortion from occurring in the horizontal sync pulses, the phase of the FM carrier corresponding to the front porch is first reset so that transient distortion occurs at the front porch. Then, when the phase of the FM carrier corresponding to the tip portion of a horizontal sync pulse is reset, discontinuous variations in the phase of the FM carrier do not occur. Consequently resetting does not cause transient distortion at the tip portion during FM demodulation (see Japanese Patent Application for Unexamined Patent No. 17980/1991). After the resetting, as illustrated in FIG. 9, the FM carrier is frequency-converted by an analog multiplier 69. A signal (48.6 MHz) sent from a local oscillator 68 to the analog multiplier 69 is in synchronous with a master clock. The output signal of the analog multiplier 69 is input into a low-pass filter 70 where the FM carrier whose center frequency has shifted to 15.5 MHz while maintaining a frequency deviation $\Delta f$ at 2.6 MHz is separated. Here, the center frequency $f_o$ of the FM carrier transmitted from the multivibrator 64 is set at 64.1 MHz. The reason for setting the frequency at 64.1 MHz is to facilitate the removal of third harmonics which are produced as the output waveform of the multivibrator 64 is a square wave.

The following explains the case where a conventional demodulation method of multiplying the frequency by four times is adopted and the frequency of the carrier is lowered so as to achieve high-density recording. In this case, however, in terms of the output signal of the FM demodulator, as illustrated in FIG. 8(c), since the frequency spacing between the lower sideband of the FM carrier whose frequency is four times the input frequency and the demodulated signal band is small, even when a low-pass filter is used to remove the lower sideband components, some components are mixed in the video signal. Moreover, if recording is performed without resetting the phase of the FM carrier to the reference phase, running beat strips appear, deteriorating the quality of the image.

On the other hand, if recording is performed by resetting the phase of the FM carrier to the reference phase, running beat strips do not appear. However, the lower sideband components contained in the demodulated video signal cause distortion of image. In the case of recording and reproduction of the 100% multiburst signals, although distortion of image can not be detected, waveform distortion reaches about 10%. In other words, while moire does not appear, waveform distortion prevents reproduction of a high-quality image.

SUMMARY OF THE INVENTION

An object of the present invention is to provide a magnetic reproduction apparatus which produces a high-quality image.

In order to achieve this objective, a magnetic reproduction apparatus of the present invention uses a magnetic recording medium on which FM signals produced by frequency-modulating a carrier with wide-band video signals are recorded, and demodulates reproduced signals from the magnetic recording medium into the video signals. The magnetic reproduction apparatus is characterized in including a frequency converter for causing the reproduced signals to shift to a higher frequency and a pulse-count-type FM demodulator for demodulating the reproduced signals which have shifted to the higher frequency into the video signals.

This arrangement restrains the mixing of reproduced signals in the video signals. It is thus possible to obtain the video signals with lessened waveform distortion, thereby achieving a high-quality image.

For a fuller understanding of the nature and advantages of the invention, reference should be made to the following detailed description taken in conjunction with the accompanying drawings.

BRIEF DESCRIPTION OF THE DRAWINGS

FIG. 1 is a block diagram illustrating the structure of the essential components of a magnetic reproduction apparatus.

FIG. 2 illustrates graphs showing the spectrum of output signals from different sections of the magnetic reproduction apparatus of FIG. 1, wherein 2(a) is the spectrum of an output signal of the head amplifier/equalizer, 2(b) is the spectrum of an output signal of the analog multiplier, 2(c) is the spectrum of an output signal of the high-pass filter, and 2(d) is the spectrum of an output signal of the pulse-count-type FM demodulator.

FIGS. 5 through 10 illustrate conventional examples.

FIG. 5 is a block diagram illustrating the structure of a VTR system incorporating a two-channel TCI encoder/decoder.

FIG. 6 is a timing chart illustrating the relation between the HDTV baseband signals and a line sequenced color-difference TCI signal.

FIG. 7 illustrates graphs showing the spectrum of signals reproduced by the magnetic reproduction apparatus of FIG. 5, wherein 7(a) is the spectrum of an FM carrier reproduced from a magnetic tape, 7(b) is the spectrum of an output signal from the frequency doubler when the FM carrier is input thereto, and 7(c) is the spectrum of an output signal from the pulse-count-type FM demodulator when the output of the frequency doubler is input thereto.

FIG. 8 illustrates graphs showing the spectrum of signals reproduced from a magnetic tape, the signals being recorded on the tape after being caused to shift to a lower frequency, wherein 8(a) is the spectrum of an FM carrier reproduced from the magnetic tape, 8(b) is the spectrum of an output signal from the frequency doubler when the FM carrier is input thereto, and 8(c) is the spectrum of an output signal from the pulse-count-type FM demodulator when the output of the frequency doubler is input thereto.

FIG. 9 is a block diagram illustrating the structure of the essential components of a magnetic reproduction apparatus adopting an FM carrier reset recording method.

FIG. 10 is a view explaining the process of resetting an FM carrier according to the magnetic reproduction apparatus of FIG. 9.

DESCRIPTION OF THE EMBODIMENTS

A first embodiment of the present invention is described below with reference to FIGS. 1 and 2.

Figure 1:
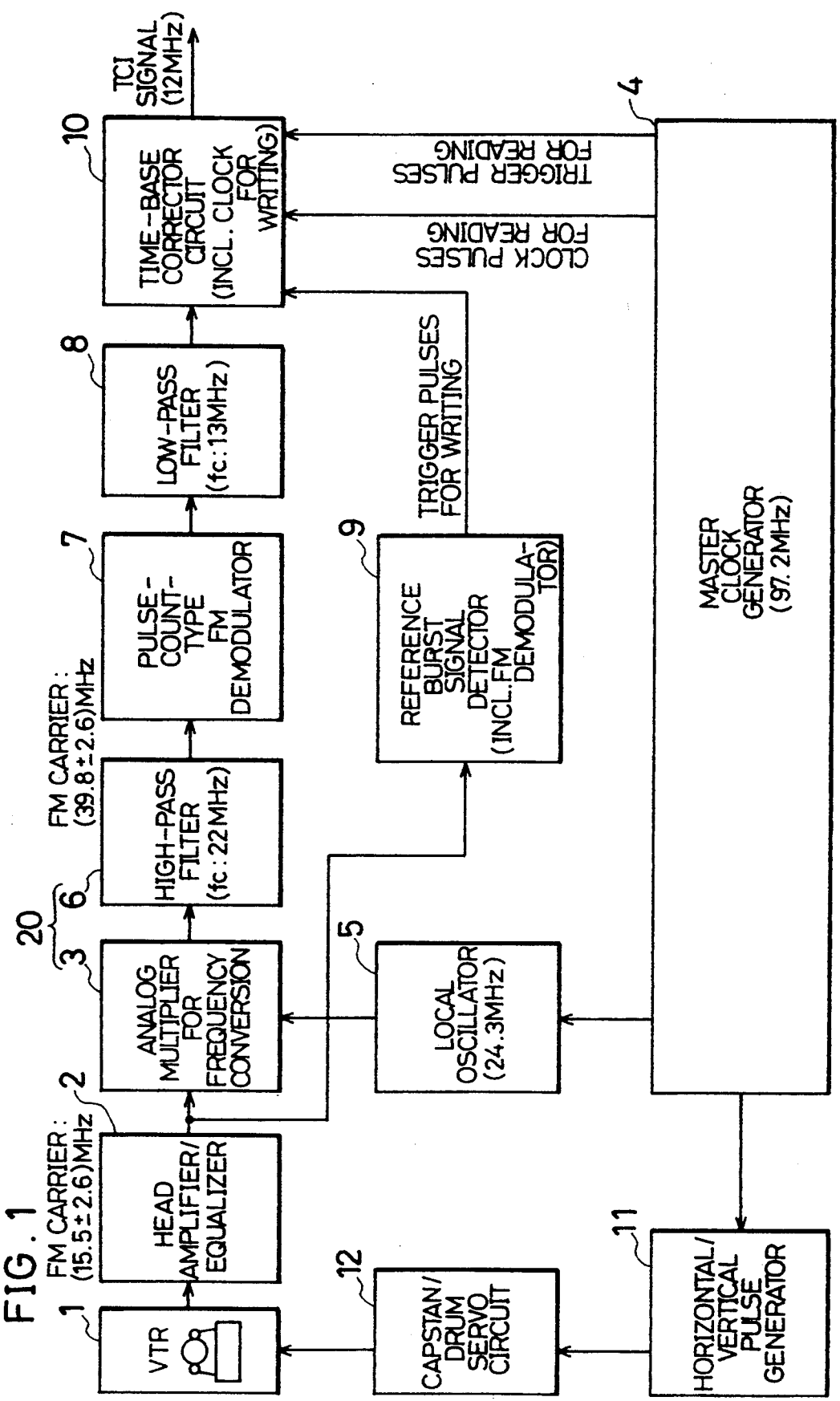
FIGS. 1 and 2 illustrate a first embodiment of the present invention.
Figure 2:
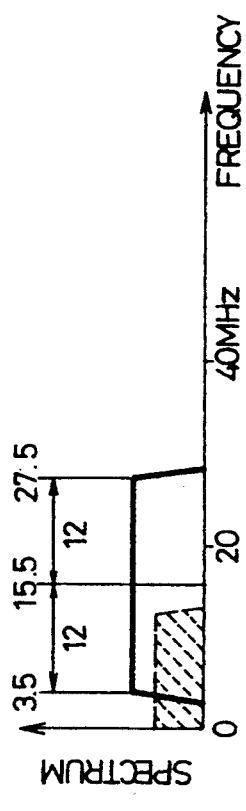
Figure 2:
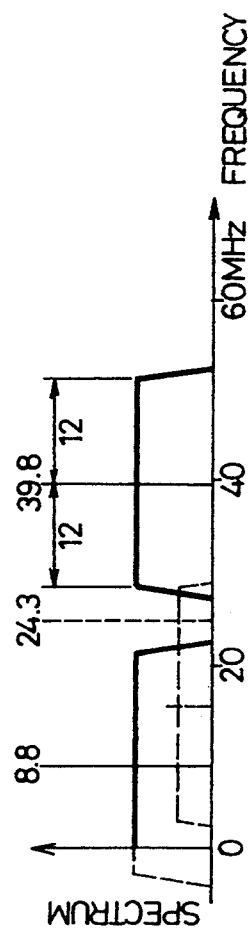
Figure 2:
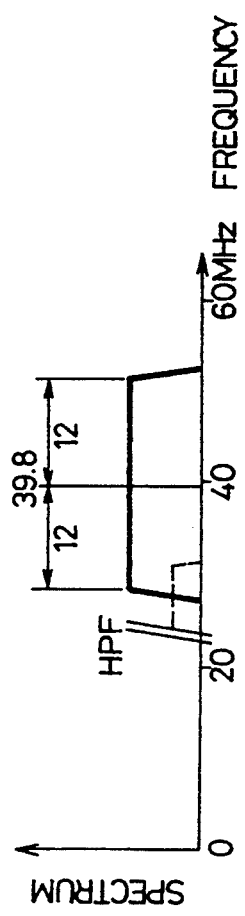
Figure 2:
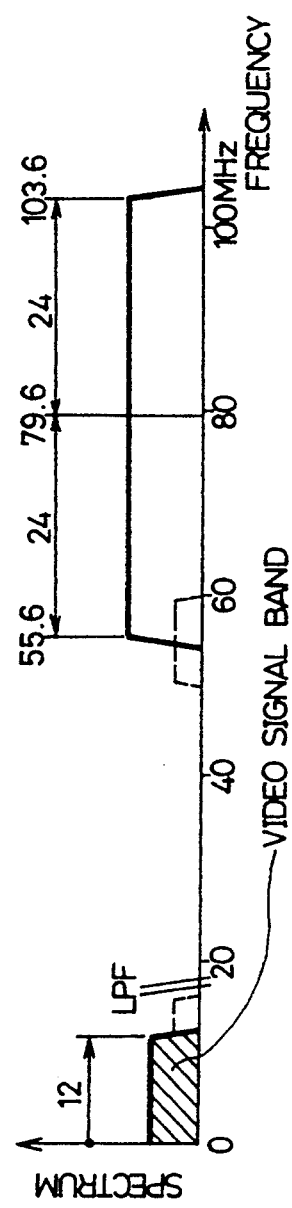

In a magnetic reproduction apparatus of this embodiment, as illustrated in FIG. 1, reproduced signals from a magnetic tape loaded in a VTR (video tape recorder) 1 is amplified in a head amplifier/equalizer 2 and then input into an analog multiplier 3 for frequency conversion. A running speed of the magnetic tape is controlled by a capstan/drum servo circuit 12 based on synchronizing pulses generated by a horizontal/vertical pulse generator 11. The horizontal/vertical pulse generator 11 produces the synchronizing pulses according to a clock signal with a frequency of 97.2 MHz, generated by a master clock generator 4.

An FM carrier is recorded on the magnetic tape with a carrier reset recording method. The head amplifier/equalizer 2 outputs a reproduced FM carrier having a center frequency of 15.5 MHz and a bandwidth of 12 MHz as shown in FIG. 2(a).

A sine wave signal of 24.3 MHz from a local oscillator 5 is input into the analog multiplier 3. The sine wave signal is locked with the master clock signal generated by the master clock generator 4. The analog multiplier 3 performs the analog multiplication of the sine wave signal and the FM carrier from the head amplifier/equalizer 2. Thus, as shown in FIG. 2(b), the FM carrier is converted into two FM carriers: an FM carrier of the 8.8-MHz center frequency (obtained by causing the FM carrier to shift to a lower frequency region) and an FM carrier of the 39.8-MHz center frequency (obtained by causing the FM carrier to shift to a higher frequency region). It is arranged that the sine wave signal from the local oscillator 5 substantially does not leak into the output of the multiplier 3.

The output of the analog multiplier 3 is input into a pulse-count-type FM demodulator 7 via a high-pass filter 6 with a cut-off frequency of 22 MHz. Since the spectrums not higher than 15 MHz are sufficiently attenuated by the high-pass filter 6, the FM carrier, which has shifted to the higher frequency region so as to have the 39.8-MHz center frequency while maintaining the 12-MHz bandwidth, is extracted as illustrated in FIG. 2(c). In this embodiment, the analog multiplier 3 and the high-pass filter 6 constitute means 20 for causing an FM carrier to shift to a higher frequency region.

As illustrated in FIG. 2(d), the output of the FM demodulator 7 contains a demodulated signal of the 12-MHz bandwidth, the second higher harmonics of the FM carrier (center frequency: 79.6 MHz, bandwidth: 24 MHz) in the higher frequency region, and the sixth harmonics of the FM carrier in the higher frequency region. However, there is sufficient frequency spacing between the lower sideband of the second harmonics and the demodulated signal band. Then, when the output signal of the FM demodulator 7 is input into a low-pass filter 8 whose cut-off frequency is 13 MHz, only the demodulated signal is extracted. Consequently waveform distortion of the demodulated signal decreases.

In the case where the signal input to the FM demodulator 7 contains even higher harmonics or sub-harmonics as well as the FM carrier in the higher frequency region, the output signal contains higher harmonics other than the above-mentioned higher harmonics. Then, waveform distortion of the demodulated signal occurs. It is therefore advisable to minimize the waveform distortion of the input signal.

The FM carrier from the head amplifier/equalizer 2 is also input into a reference burst signal detector 9. In the detector 9 a portion of the FM carrier corresponding to the tip portion of a horizontal sync pulse is extracted, and the extracted portion is hereinafter referred to as a burst signal. Jitter is detected from the burst signal, and a trigger pulse for writing data in a time base corrector (TBC) circuit 10 is generated according to the jitter.

The demodulated signal from the low-pass filter 8 is written in the TBC circuit 10 based on the trigger pulse and read out in synchronization with the clock pulse and trigger pulse from the master clock generator. After the time base of the demodulated signal is corrected, the signal is sent as a TCI signal to a TCI decoder (not shown), and thereby luminance signal Y, color-difference signals $P_R$, $P_B$ are obtained.

With this arrangement the reference burst signal detector 9 serves as jitter eliminating means. The following explains elimination of jitter carried out based on the FM carrier which has not yet shifted to the higher frequency region.

Assuming that an input signal, $S(t)$, before modulation is a cosine signal with a single frequency, $f_p$, and a fixed amplitude, a, the signal at time t is expressed as:

$$S(t) = a \cdot \cos(2\pi f_p t)$$

An FM carrier obtained by frequency-modulating a carrier having an amplitude, $A_c$, and a center frequency, $f_c$, with the input signal $S(t)$ is written:

$$F_c(t) = A_c \cos\{2\pi f_c t + \Delta f / f_p \cdot \sin(2\pi f_p t)\}$$

where $\Delta f$ is frequency deviation.

In general, time fluctuation, i.e., jitter occurs in the FM carrier reproduced from the magnetic tape. Denoting jitter as $\Delta t$, the FM carrier is written:

$$F_c(t+\Delta t) = A_c \cos[2\pi f_c(t+\Delta t) + \Delta f / f_p \cdot \sin\{2\pi f_p(t+\Delta t)\}]$$

On the other hand, it is assumed that the local oscillator 5 transmits to the analog multiplier 3 a cosine wave locked with a master clock signal of the master clock generator 4, $$F_o(t) = A_o \cos(2\pi f_o t)$$

where $f_o$ is a frequency and $A_o$ is an amplitude. The resulting output is $$\begin{aligned} G(t+\Delta t) &= F_c(t+\Delta t) \cdot F_o(t) \\ &= A_c A_o/2 \cdot \cos[2\pi f_c(t+\Delta t) + \\ &\quad \Delta f/f_p \cdot \sin\{2\pi f_p(t+\Delta t)\} + 2\pi f_o t] + \\ &\quad A_c A_o/2 \cdot \cos[2\pi f_c(t+\Delta t) + \\ &\quad \Delta f/f_p \cdot \sin\{2\pi f_p(t+\Delta t)\} - 2\pi f_o t] \end{aligned}$$

Denoting the first term of the right member as $G_1(t+\Delta t)$ and defining $$G_1(t+\Delta t) \equiv A_c A_o/2 \cdot \cos\phi_1,$$

a demodulated signal, $H_1$, which is obtained by frequency-demodulating or frequency-discriminating $G_1(t+\Delta t)$ extracted by the high-pass filter 6, is $$H_1(t+\Delta t) = d\phi_1/dt \\ = 2\pi[f_o + \{1 + d(\Delta t)/dt\} \times \{f_c + \Delta f \cos(2\pi f_p(t+\Delta t))\}]$$

$\Delta t$ is caused due to fluctuation in a running speed of the magnetic tape and stretching thereof. The jitter spectrum caused by such fluctuation is not higher than several hundred hertz, while the jitter spectrum resulted from the stretching reaches several kilohertz. The intensity of spectrum decreases in inversely proportional to frequency. Thus, normally, it can be expressed that $d(\Delta t)/dt \ll 1$. Then $$H_1(t+\Delta t) = 2\pi[f_o + f_c + \Delta f \cos\{2\pi f_p(t+\Delta t)\}]$$

Meanwhile, denoting the portion of the FM carrier corresponding to the tip portion of the horizontal sync pulse and its frequency as $F_s(t)$ and $f_s$, respectively, it can be expressed $$F_s(t) = A_c \cos(2\pi f_s t)$$

In reproduction, since the same time fluctuation $\Delta t$ occurs in the burst signals, $$F_s(t+\Delta t) = A_C \cos\{2\pi f_s(t+\Delta t)\}$$

It is therefore possible to eliminate jitter by using $F_s(t+\Delta t)$ which has not yet shifted to the higher frequency region as a reference signal for eliminating the jitter in the demodulated signal of the FM carrier in the higher frequency region.

Moreover, in the case where the frequency of an oscillation signal from the local oscillator 5 is set to an integral multiple of the frequency of horizontal pulses, even if moire occurs, it can be stilled on the screen by phase-locking the oscillation signal with the horizontal pulses. Consequently, even if the FM carrier which has not yet shifted to the higher frequency region leaks into the output of the analog multiplier 3 (DU ratio: around 30 dB), the effect is hardly visible.

Figure 3:
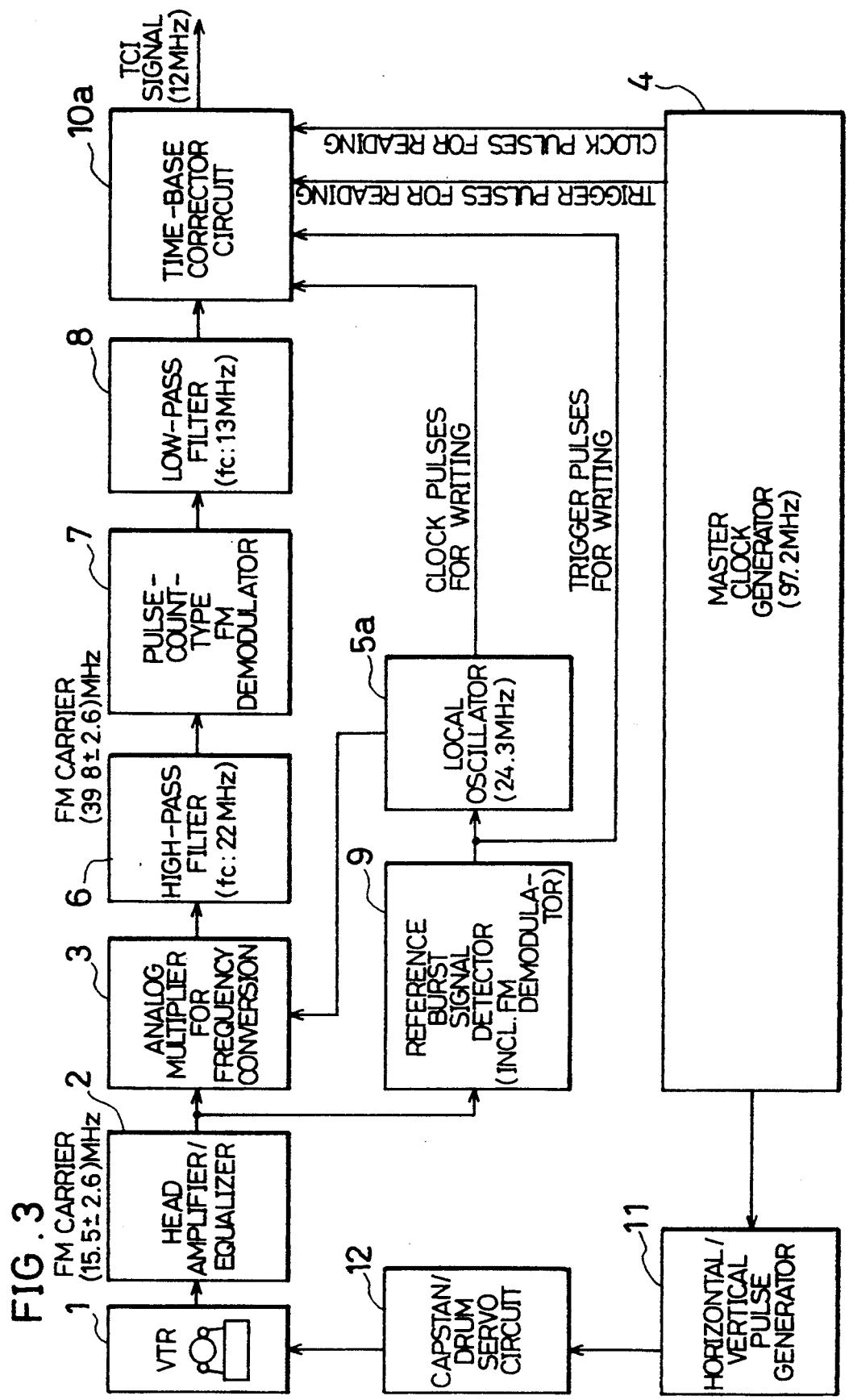
FIG. 3 is a block diagram illustrating the structure of the essential components of a magnetic reproduction apparatus according to a second embodiment of the present invention.

With reference to FIG. 3, a second embodiment of the present invention is described below. As for members which perform the same functions as the members shown in the drawings of the above-mentioned embodiment, the same reference numerals are given and explanation thereof is omitted.

A difference between a magnetic reproduction apparatus of this embodiment and that of the above-mentioned embodiment is that an oscillation signal of an local oscillator 5a is locked with a trigger pulse from the reference burst signal detector 9. The oscillation signal of the local oscillator 5a is input not only into the analog multiplier 3, but also into a TBC circuit 10a as a clock pulse for writing data therein.

With this arrangement, the output of the local oscillator 5a is $$F_o(t+\Delta t) = A_o \cos\{2\pi f_o(t+\Delta t)\}$$

Here, if the demodulated signal is denoted as $H_1(t+\Delta t)$ and calculated in a similar manner to the above embodiment, $$\begin{aligned} H_1(t+\Delta t) &= 2\pi\{1 + d(\Delta t)/dt\} \times \\ &\quad \{f_o + f_c + \Delta f \cos[2\pi f_p(t+\Delta t)]\} \\ &\approx 2\pi\{f_o + f_c + \Delta f \cos[2\pi f_p(t+\Delta t)]\} \end{aligned}$$

Hence, elimination of jitter is also achieved in this embodiment.

Figure 4:
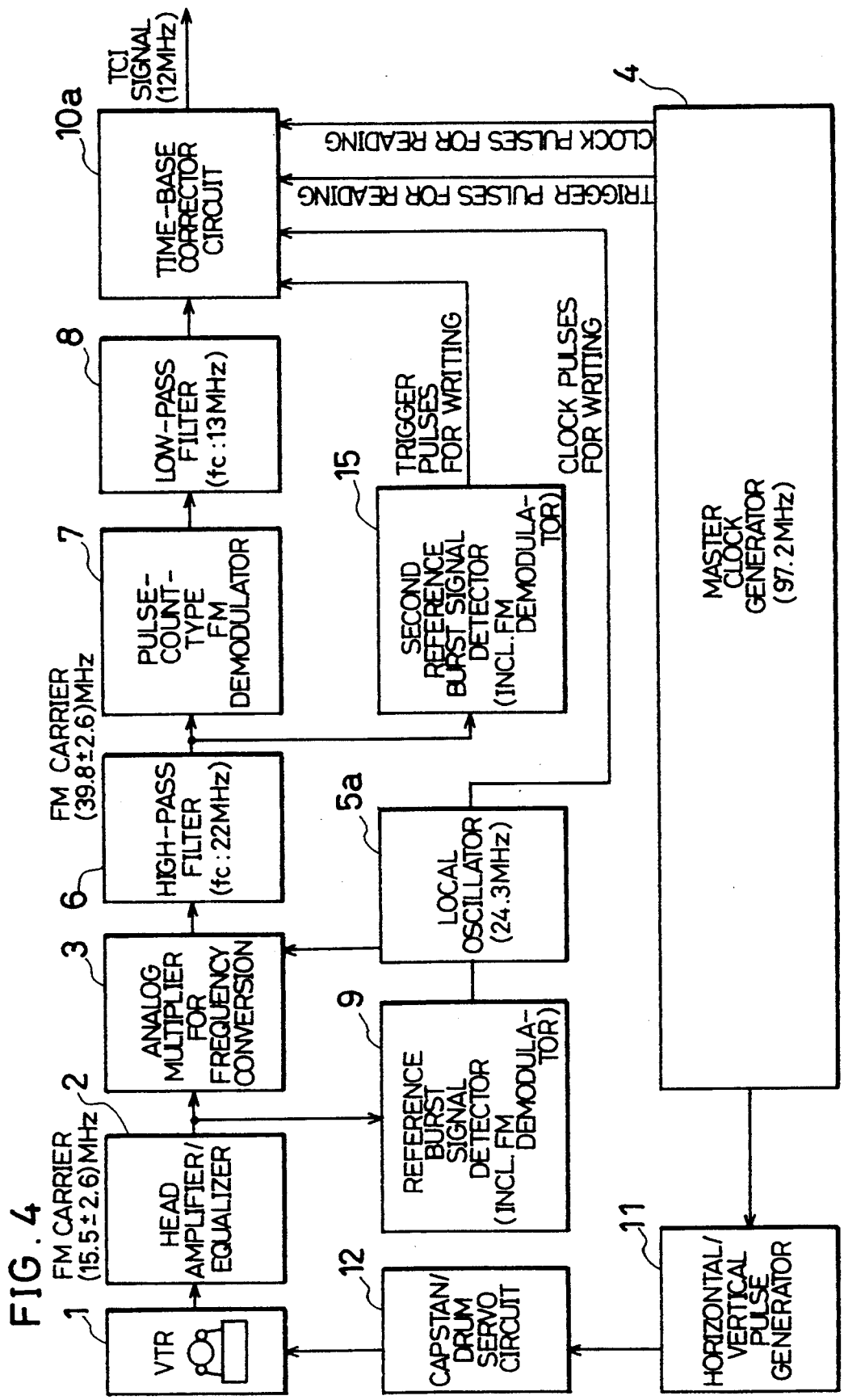
FIG. 4 is a block diagram illustrating the structure of the essential components of a magnetic reproduction apparatus according to a third embodiment of the present invention.
Figure 5:
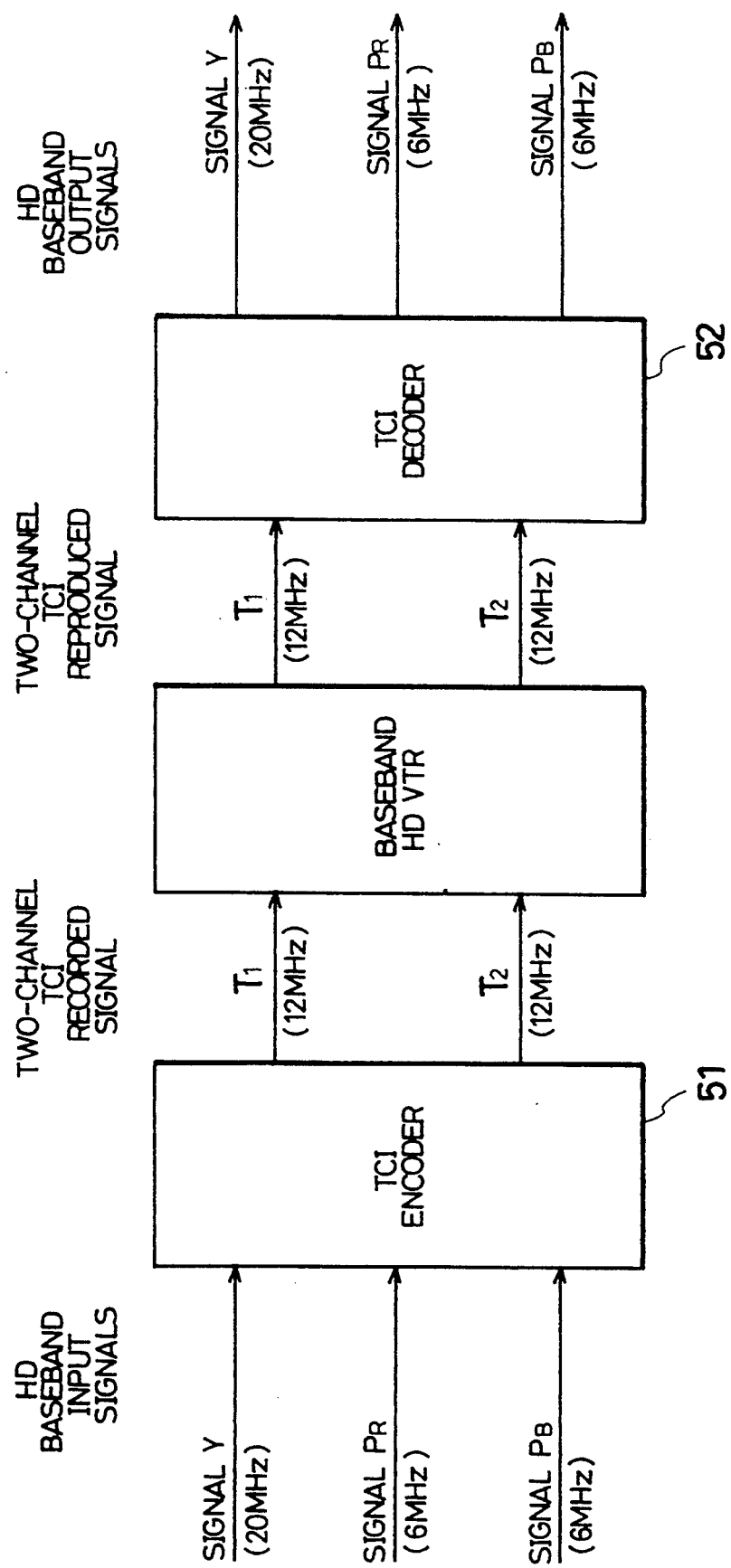
Figure 6:
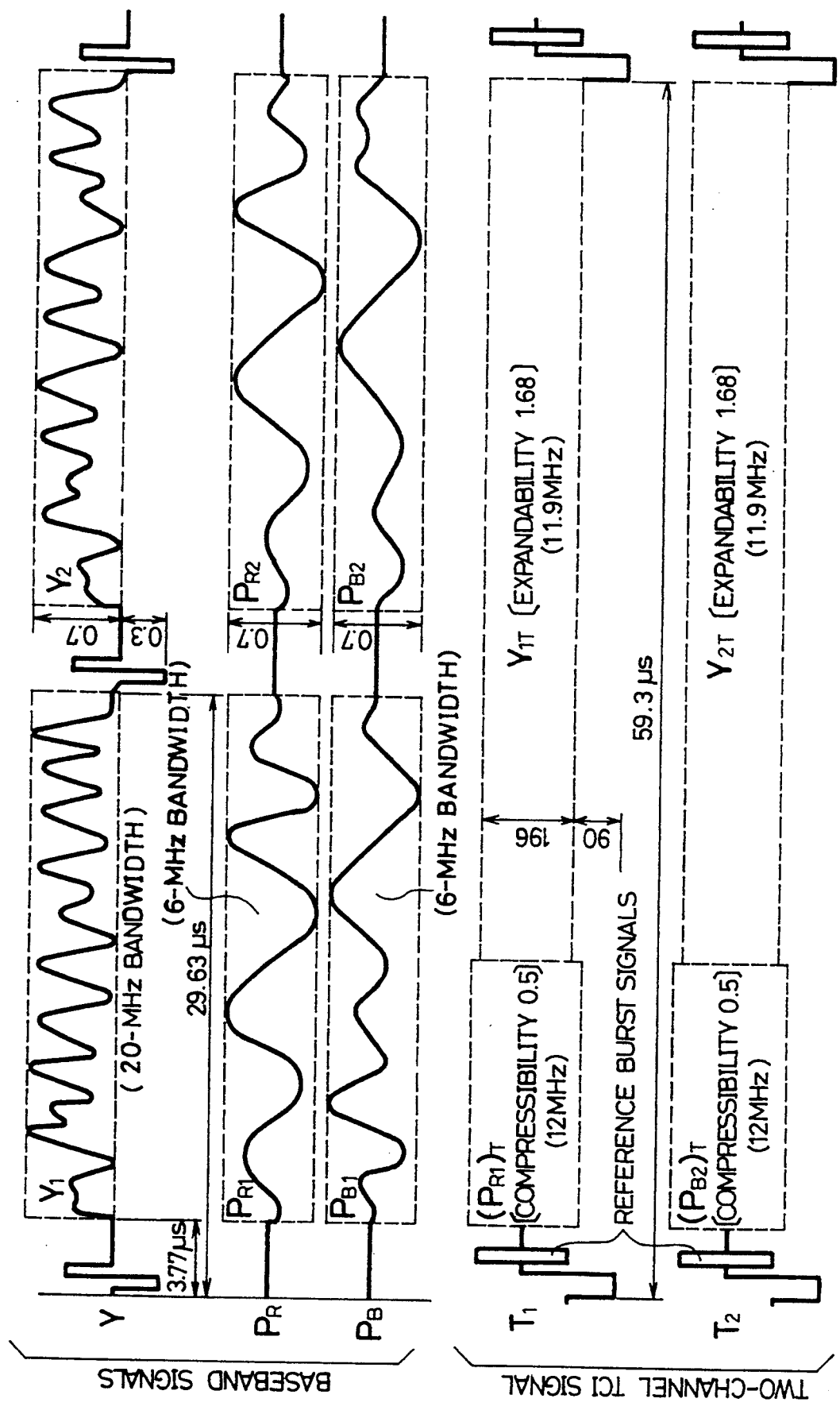
Figure 9:
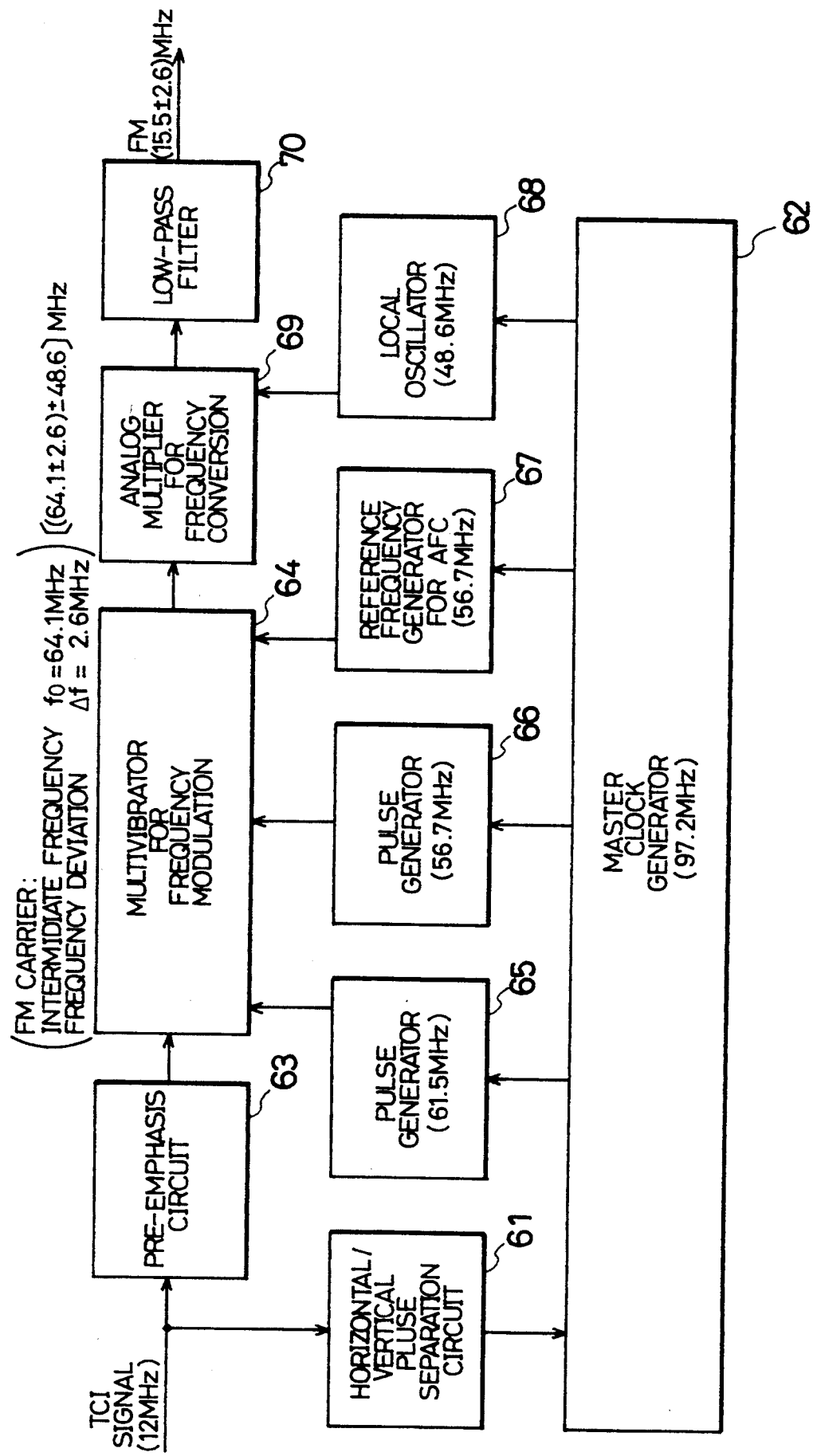
Figure 10:
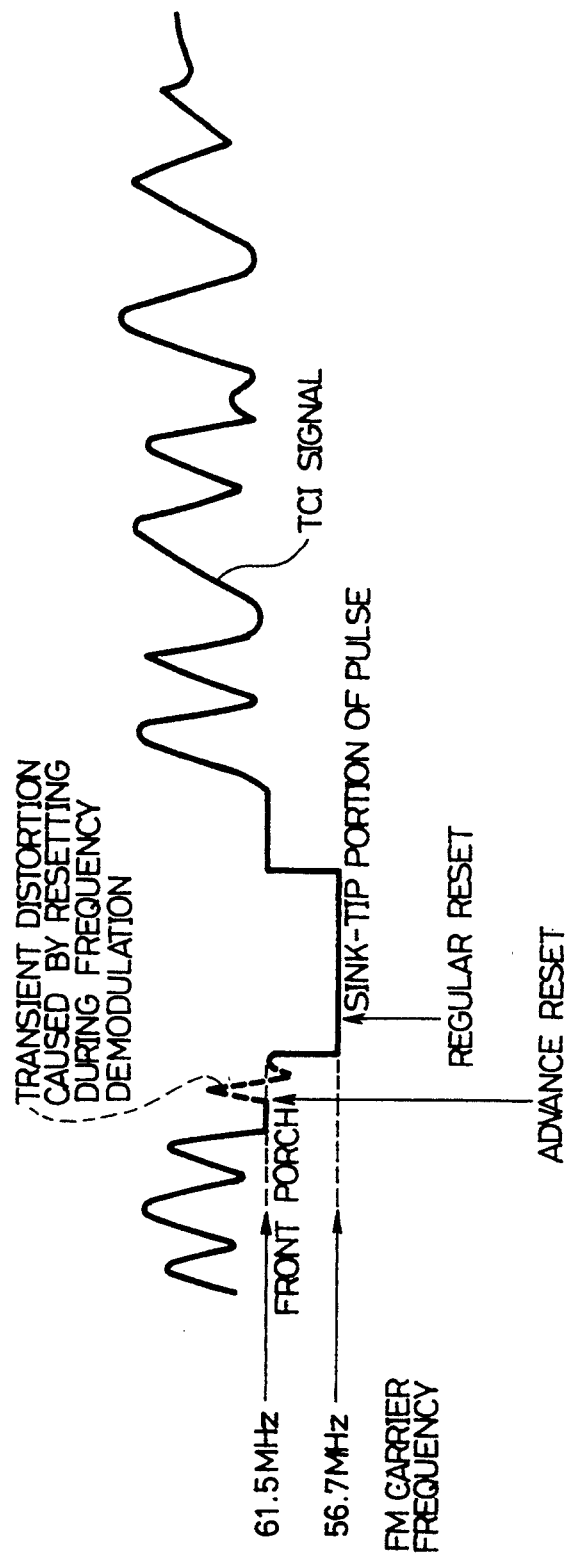

The following describes a third embodiment of the present invention with reference to FIG. 4. As for members which perform the same functions as the members shown in the drawings of the above-mentioned embodiments, the same reference numerals are given and explanation thereof is omitted.

A difference between a magnetic reproduction apparatus of this embodiment and those of the above-mentioned embodiments is that the apparatus of this embodiment has a second reference burst signal detector 15 for generating a trigger pulse for writing data in the TBC circuit 10a as well as the reference burst signal detector 9.

In the second reference burst signal detector 15, a signal corresponding to the tip portion of a horizontal pulse is extracted from the FM carrier which has shifted to the higher frequency region and transmitted from the high-pass filter 6. The extracted signal is hereinafter referred to as a second burst signal. Jitter is detected in the second burst signal, and the trigger pulse used for writing data in the TBC circuit 10a is generated based on the jitter.

If the FM carrier in the higher frequency is denoted as $G_s(t+\Delta t)$, $$G_s(t+\Delta t)=A_cA_o/2\cdot\cos\{2\pi(f_o+f_s)\times(t+\Delta t)\}$$

Therefore, by using $G_s(t+\Delta t)$ as a reference signal for eliminating jitter, the jitter is eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic reproduction apparatus for use with a magnetic recording medium, on which frequency-modulated signals produced by frequency-modulating a carrier with video signals are recorded, said magnetic reproduction apparatus comprising:
   a frequency converter responsive to reproduced siqnals from said recordinq medium for causing the reproduced signals to shift to a higher frequency region to provide shifted reproduced signals;
   a pulse-count-type FM demodulator for demodulating the shifted reproduced signals which have been shifted to the higher frequency region to provide video signals;
   a time-base corrector circuit into which the video signals are written as data and from which the data are read out in synchronization with a reference clock; and
   a reference burst signal detector for extracting a portion of the reproduced signals from said recording medium or of the shifted reproduced signals in the higher frequency region, said portion corresponding to the tip portions of horizontal pulses, and for generating a trigger pulse which triggers the writing operation of the video signals into said time-base corrector circuit in accordance with the phase of the extracted portion of the signals.

2. A magnetic reproduction apparatus according to claim 1 and further including:
   a local oscillator for generating an oscillation signal; and
   said frequency converter includes an analog multiplier for multiplying the oscillation signal and the reproduced signals from said recording medium.

3. A magnetic reproduction apparatus according to claim 1 wherein said reference burst signal detector comprises:
   a first reference burst signal detector for extracting a portion of the reproduced signals from said recording medium to provide a trigger pulse to the time-base corrector circuit.

4. A magnetic reproduction apparatus according to claim 3 and further including:
   a local oscillator for generating an oscillation signal; and
   said frequency converter includes an analog multiplier for multiplying the oscillation signal and the reproduced signals from said recording medium.

5. A magnetic reproduction apparatus in accordance with claim 4 wherein said local oscillator generates an oscillation signal which is phase-locked with the trigger pulse of said reference burst signal detector.

6. A magnetic reproduction apparatus in accordance with claim 2 and further including a master clock generator and said local oscillator generates an oscillator signal which is responsive to said master clock generator.

7. A magnetic reproduction apparatus according to claim 6 wherein said frequency converter includes an analog multiplier for multiplying the oscillamion signal and the reproduced signal from said recording medium.

8. A magnetic reproduction apparatus according to claim 1 wherein
   said reference burst signal detector comprises a reference burst signal detector for extracting a portion of the shifted reproduced signals which have been shifted to the higher frequency region for generating said trigger pulse to the time-base corrector circuit;
   said apparatus further including
   a further reference burst signal detector for extracting a portion of the reproduced signal from said recording medium; and
   a local oscillator for generating an oscillation signal which is phase-locked with the trigger pulse of the first reference burst detector and is supplied as a write clock signal to said time-base corrector;

* * * * *